Figure 1:
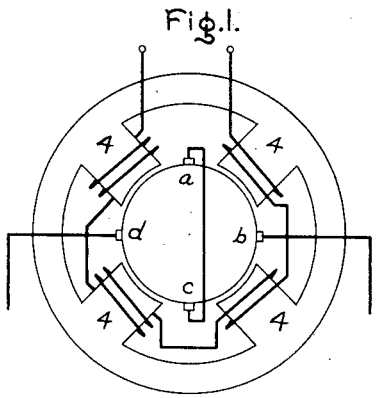

Sept. 28, 1937.  J. M. PESTARINI  2,094,492

CONTROL OF THE EXCITATION OF ELECTRICAL MACHINES

Filed July 13, 1934

Inventor:
Joseph Maximus Pestarini,
by Harry E. Dunham
His Attorney.

Patented Sept. 28, 1937

2,094,492

UNITED STATES PATENT OFFICE 2,094,492

CONTROL OF THE EXCITATION OF ELECTRICAL MACHINES

Joseph Maximus Pestarini, Grant City, Staten Island, N. Y.

Application July 13, 1934, Serial No. 735,003
In Great Britain August 21, 1933

6 Claims. (Cl. 172—239)

This invention relates to electrical machines having a field which must be continuously adjusted in order to obtain a desired characteristic; for instance in order to obtain a constant voltage under variable load, or a desired volt-ampere characteristic, or a desired torque-speed characteristic or any other operating characteristic of the machine. Some means or devices are usually provided which are responsive to the variation of the variable quantity, and which act upon the field increasing or decreasing its ampere turns. The adjustment of the field is obtained by varying the voltage across its terminals. As the field coils have a great reactance compared with their resistance, the modification of the current will follow the modification of the voltage with a certain time delay that spoils the adjustment. Further the apparatus embodying the device sensitive to the variation of the variable quantity and adjusting the voltage at the terminals of the field coils, is generally complicated and expensive and its sensitiveness decreases quickly when the electrical energy required by the field increases.

An object of my invention is to provide an improved electrical power system having a simple arrangement of machines and field exciting windings such that the desired characteristic of the system can be readily obtained.

The present invention consists essentially in the use of a special dynamo-electric machine which supplies the field coils of the main machine with current and which is controlled by the device which in the conventional equipment operated directly upon the field coils of the main machine; the special machine is preferably an adequately arranged metadyne. The metadyne is an electrical rotating machine such as mentioned in my United States Patent No. 1,945,447 and Patent No. 1,962,030. The metadyne essentially consists of a rotor or armature with winding and commutator as in dynamo machines; a stator is provided which mainly affords a return path of low magnetic reluctance for the fluxes which are set up by the rotor currents. Generally the commutator carries two sets of brushes electrically displaced from one another, the current traversing one set of brushes creates by its rotor ampere-turns a flux which by rotation of the rotor induces an electromotive force between the brushes of the other set. One set of brushes called the primary set and traversed by a current called the primary current is connected to provide a primary circuit through the armature, is generally connected to a supplying source of direct current; the other set of brushes, called the secondary set and traversed by a current called the secondary current, is generally connected to an electrical load or consumers supplied with current by the metadyne and provide an external secondary circuit.

A description in detail of the metadyne principles is given in a paper entitled "Esquisse sur la Metadyne" by J. M. Pestarini in the "Bulletin Scientifique A. I. M." No. 4, April, 1931 of "L'Association des Ingeineurs Electriciens" published by the "Institut Electritechnique Monteflore", Liege, Belgium.

According to the present invention the secondary brushes of the metadyne are connected to the field coils of the main dynamo-electric machine or generator and supplies them with a current which has a desired strength independently from its secondary voltage; that is, the voltage induced between its secondary brushes; the strength of the secondary current of the metadyne is controlled by the ampere-turns of a small stator winding, called a variator winding, having its magnetic axis in the direction of the commutating axis of the secondary set of brushes for producing a component of magnetic flux along this axis. The variator winding is in its turn controlled by a control device, such as a variable field resistor or exciter which in the conventional arrangement acts directly upon the field coils of the main machine. When a variation of the secondary current is required the metadyne automatically supplies at its secondary brushes an excess voltage which is exactly adjusted to the reactance of the field coils and which disappears as the secondary current reaches the proper value.

The metadyne is thus inserted between the field exciting windings of the main machine and the device that originally acted directly upon the field coils, and it acts as an amplifier with the important feature of supplying automatically an excess voltage adequate to overcome the reactance of the field coils of the main machine.

Figure 2:
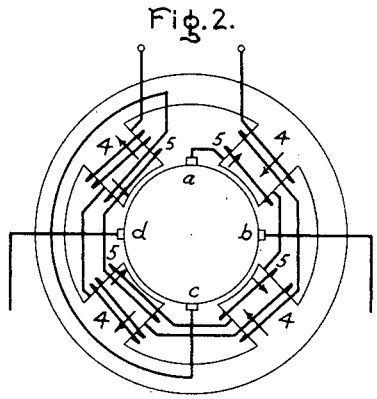
Figure 3:
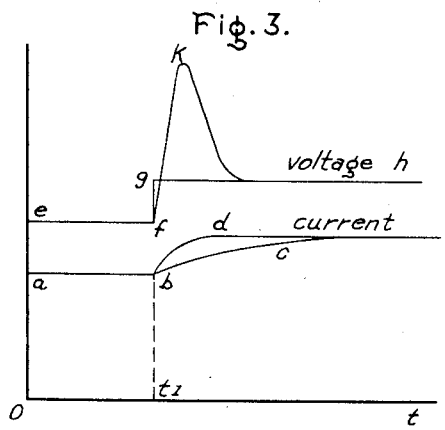
Figure 4:
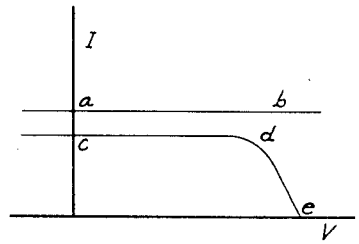
Figure 5:
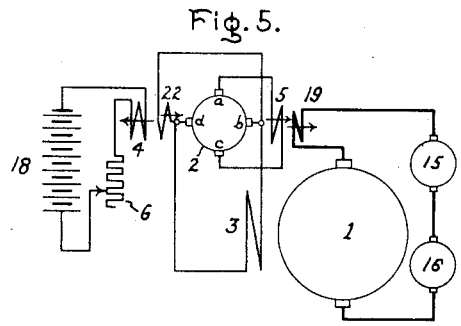
Figure 6:
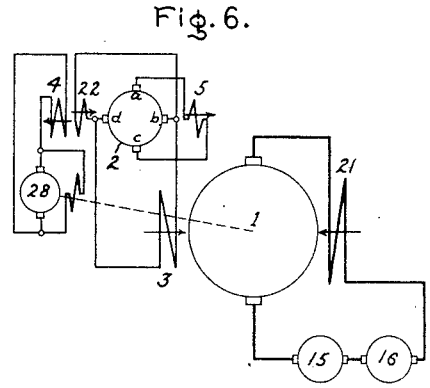
Figure 7:
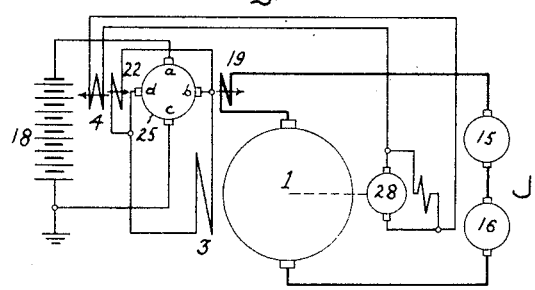

Figs. 1 and 2 illustrate in detail the machine generally used; Fig. 3 is a diagram showing the transition in current and voltage impressed on the field coils; Fig. 4 shows the characteristic curves of an astatic dynamo-electric machine; Figs. 5, 6, and 7 illustrate systems utilizing my improved excitation arrangement.

Reference being made to Figs. 5 and 6, the main dynamo-electric machine or generator regardless of the kind of current it uses, whether direct current or alternating current, is indicated at 1; its field is indicated by 3; and the special metadyne is indicated by 2. Two sets of brushes are indicated on the metadyne; the primary set comprises the brushes a and c, which are not connected to an outside source, but are short-circuited through a field exciting winding 5 having its magnetic axis along the secondary commutating axis; the secondary brushes b and d are connected to the field 3 of the main machine 1. This metadyne, called a conformer metadyne, is a modification of the general scheme of metadynes made adequate to the actual purpose. A variator winding 4 is shown having its magnetic axis in the direction of the axis of the two secondary brushes bd which is also the commutation axis of the same brushes. This arrangement allows for an immediate and easy visualization of the magnetic interactions between stator and rotor windings. The variator winding 4 will be controlled by the device which in the conventional arrangement acts upon the field of the main machine. The device is shown as a variable resistor 6, in Fig. 5, but might be an auxiliary dynamo-electric machine or exciter, in which case it will be of very small size even if the main machine 1 is a large one, because the energy necessary to energize the low reactance variator winding 4 is small.

Fig. 1 shows some constructional details of the conformer metadyne; the primary brushes a and c are short circuited and the secondary brushes b—d are connected to the field of the main machine. The stator has four polar segments forming salient poles, rather than a simple magnetic ring, and the disposition of the polar segments is such as not to interfere with the commutation zones of the brushes. A polar segment does not mean the same thing as a pole in a conventional dynamo where each pole carries the total flux and where each north pole is always followed by a south pole and vice versa. In a metadyne a polar segment carries usually only a part of the total flux and a north polar segment may be followed sometimes by another north polar segment, sometimes by a south polar segment and sometimes by a polar segment carrying no flux at all, the distribution of the flux depending on the load. The variator winding 4 is distributed upon the four polar segments such that the magnetic axis of the whole variator is in the direction bd of the secondary brushes, as indicated by the arrows on Figs. 2, 5, 6, and 7, which also is the commutating axis of the secondary current.

It has been found useful for good operation to short circuit the primary brushes not directly but through a stator winding, called a primary stabilizing winding 5, as illustrated in Figs. 2, 5, and 6, which is traversed by the primary current and which induces between the primary brushes an electromotive force which opposes the primary current by providing a magnetic flux in opposition to the flux produced by current flowing in the armature secondary circuit.

The diagram of Fig. 3 illustrates a comparison of the operation with and without the application of the present invention. Time $t$ is taken as abscissae. At the origin of time, the current in the field coils 3 has the value $oa$ while the voltage at the terminals has the value $oe$ equal to the ohmic drop in the coils. Let us suppose that the field 3 is supplied from a constant voltage network through a resistance which may be varied by a powerful relay, and that at the instant $t_1$ the relay short circuits that resistance. Then the voltage impressed upon the field coils will instantly increase to the value $t_1 g$ and remain afterwards constant as indicated by the straight line $gh$. The field current will increase very slowly owing to the large reactance of the field coils and it will follow an exponential line $bc$ rising very slowly. In the systems illustrated the conformer metadyne will give automatically a large peak of secondary voltage, as indicated by the line $kh$ which in Fig. 3, will accelerate the increase of the current in the field 3 of Figs. 5, 6, and 7 in accordance with the line $bd$. The peak of voltage will disappear as soon as the current in the field reaches its permanent value.

The regulator dynamo current does not traverse the field coils of the main dynamo-electric machine or generator 1, but it will traverse only the small variator winding 4 of the conformer metadyne 2, which in its turn will supply with current the field exciting winding 3 of the main machine. In the case of a metadyne generator, the control of the current supplied to the motors is obtained by means of the variator winding of the generator metadyne.

Although the regulator dynamo has been considered here as the device to obtain the hyperbolic volt-ampere characteristic, any other device may be considered in the same way, the conformer metadyne being interposed between it and the main machine field.

An important application of the present invention concerns dynamos, whether operating as generators or as motors, where it is the supplied or absorbed current that eventually must be controlled. In this case the flux produced by the variator ampere-turns of the conformer metadyne is opposed by excitation produced by some ampere-turns proportional to the main dynamo current, the opposing ampere turns being created by some turns 19 traversed by the current I of the main dynamo 1. Thus the current I will adjust itself until it creates a number of ampere-turns in the winding 19 to compensate the ampere-turns in the winding 4 except for the amount, say P, necessary to create the actual current in the field 3. In order to compensate for the last amount P of ampere-turns, the conformer metadyne is provided with a supplementary secondary winding 22 connected across the secondary brushes of the conformer metadyne itself, as shown in Fig. 5. When the amount P of ampere-turns is thus provided by some means, then the current I of the main machine will follow exactly the value of the ampere-turns created in the variator winding 4 and the conformer metadyne is said to be astatic. The arrangement of Fig. 5 will make I proportional to the ampere-turns of 4 until saturation of the conformer metadyne is reached independently from the saturation of the main machine.

If an astatic conformer metadyne is used and the ampere-turns of the variator winding 4 are kept constant then the current I will be constant and the volt-ampere characteristic will be represented by the straight line $ab$ of Fig. 4. If the ampere-turns of the variator winding vary as the ordinate of the line $cde$ of Fig. 4, the same law will be followed by the current I of the main machine.

Instead of the differential field exciting winding 19 in the conformer metadyne, series ampere-turns created by the main current I may be used opposing the ampere-turns of the main field 3, as shown in Fig. 6. This gives a scheme that is derived from the scheme of Fig. 5 by substituting for the winding 19 on the conformer metadyne the winding 21 on the main machine.

Fig. 7 gives the general scheme of an alternative arrangement. Instead of using a conformer metadyne, a transformer metadyne 25 may be used the primary brushes a and c of which are connected to a source 18 of constant voltage. The scheme of Fig. 7 is derived from the scheme of Fig. 5 by the substitution for the conformer metadyne 2 of the transformer metadyne 25. Most of the above described improvements of the conformer metadyne are applicable to the transformer metadyne. A regulator dynamo 28 may be provided for energizing the field exciting variator winding 4 dependent upon an operating characteristic of the main dynamo-electric machine 1.

Various modifications of the arrangements above described will occur to those skilled in the art. I desire it to be understood, therefore, that my invention is not to be limited to the particular arrangements set forth, and I intend in the appended claims to cover all modifications which do not depart from the spirit and scope of my invention.

Having now particularly described and ascertained the nature of my said invention and in what manner the same is to be performed I declare that what I claim is:—

1. A power system including a dynamo-electric machine, a field exciting winding for said dynamo-electric machine, a metadyne transformer having an armature, means including a primary brush set and a secondary brush set associated with said armature for providing a primary and a secondary circuit through said armature, said secondary brush set being electrically displaced from said primary brush set, a source of substantially constant potential electric power supply, means for connecting said primary brush set across said source of electric power supply, a field exciting winding for said metadyne transformer, means dependent upon an operating characteristic of said dynamo-electric machine for controlling the energization of said metadyne transformer field exciting winding, a second field exciting winding for said metadyne transformer arranged to produce a component of magnetic excitation along the commutating axis of said secondary brush set, means dependent upon an operating characteristic of said secondary circuit for energizing said second field exciting winding of said metadyne transformer, and means for connecting said secondary brush set across said dynamo-electric machine field exciting winding.

2. A power system including a main dynamo-electric machine, a field exciting winding for said main dynamo-electric machine, a metadyne dynamo-electric machine having an armature, means including a primary brush set and a secondary brush set associated with said armature for providing a primary and a secondary circuit through said armature, said secondary brush set being electrically displaced from said primary brush set, means for connecting said secondary brush set across said main dynamo-electric machine field exciting winding, means connected across said primary brush set for providing an external primary circuit, a field exciting winding for said metadyne dynamo-electric machine, means dependent upon an operating characteristic of said main dynamo-electric machine for controlling the energization of said field exciting winding of said metadyne dynamo-electric machine, a second field exciting winding for said metadyne dynamo-electric machine arranged to produce a component of magnetic excitation along the commutating axis of said secondary brush set, means dependent upon an electrical characteristic of said secondary circuit of said metadyne dynamo-electric machine for energizing said second field exciting winding, a third field exciting winding for said metadyne dynamo-electric machine, and means dependent upon the load on said main dynamo-electric machine for energizing said third field exciting winding.

3. A power system including a main dynamo-electric machine, a field exciting winding for said main dynamo-electric machine, a metadyne dynamo-electric machine having an armature, means including a primary brush set and a secondary brush set associated with said armature for providing a primary and a secondary circuit through said armature, said secondary brush set being electrically displaced from said primary brush set, means for connecting said secondary brush set across said main dynamo-electric machine field exciting winding, means connected across said primary brush set for providing an external primary circuit, a field exciting winding for said metadyne dynamo-electric machine, means dependent upon an operating characteristic of said main dynamo-electric machine for controlling the energization of said field exciting winding of said metadyne dynamo-electric machine, a second field exciting winding for said metadyne dynamo-electric machine arranged to produce a component of magnetic excitation along the commutating axis of said secondary brush set, and means dependent upon an electrical characteristic of said secondary circuit of said metadyne dynamo-electric machine for energizing said second field exciting winding.

4. A power system including a main dynamo-electric machine, a field exciting winding for said main dynamo-electric machine, means dependent upon the load on said main dynamo-electric machine for energizing said field exciting winding, means including a second field exciting winding for providing a component of excitation in opposition to said first mentioned field exciting winding of said main dynamo-electric machine, a metadyne dynamo-electric machine having an armature, means including a primary brush set and a secondary brush set associated with said armature for providing a primary and a secondary circuit through said armature, said secondary brush set being electrically displaced from said primary brush set, means for connecting said secondary brush set across said second field exciting winding of said main dynamo-electric machine, means connected across said primary brush set for providing an external primary circuit, a field exciting winding for said metadyne dynamo-electric machine, means dependent upon an operating characteristic of said main dynamo-electric machine for controlling the energization of said field exciting winding of said metadyne dynamo-electric machine, a second field exciting winding for said metadyne dynamo-electric machine arranged to produce a component of magnetic excitation along the commutating axis of said secondary brush set, and means dependent upon an electrical characteristic of said secondary circuit of said metadyne dynamo-electric machine for energizing said second field exciting winding.

5. A power system including a main dynamo-electric machine, a field exciting winding for said main dnamo-electric machine, means dependent upon the load on said main dynamo-electric machine for energizing said field exciting winding, a metadyne dynamo-electric machine having an armature, means including a primary brush set and a secondary brush set associated with said armature for providing a primary and a secondary circuit through said armature, said secondary brush set being electrically displaced from said primary brush set, means including a second field exciting winding connected across said secondary brush set for providing a component of magnetic flux in opposition to said first mentioned field exciting winding of said main dynamo-electric machine, a field exciting winding for said metadyne dynamo-electric machine, means dependent upon an operating characteristic of said main dynamo-electric machine for controlling the energization of said field exciting winding of said metadyne dynamo-electric machine, a second field exciting winding for said metadyne dynamo-electric machine arranged to produce a component of magnetic excitation along the commutating axis of said secondary brush set, means dependent upon an electrical characteristic of said secondary circuit of said metadyne dynamo-electric machine for energizing said second field exciting winding, a third field exciting winding for said metadyne dynamo-electric machine, and means connecting said third field exciting winding across said primary brush set for providing a component of excitation in opposition to the flux produced by current flowing in said secondary circuit of said armature.

6. A power system including a main dynamo-electric machine, a field exciting winding for said main dynamo-electric machine, means dependent upon the load on said main dynamo-electric machine for energizing said field exciting winding, a second field exciting winding arranged to provide a component of excitation in opposition to said first mentioned field exciting winding of said main dynamo-electric machine, a metadyne dynamo-electric machine having an armature, means including a primary brush set and a secondary brush set associated with said armature for providing a primary circuit and a secondary circuit respectively therethrough, said secondary brush set being electrically displaced from said primary brush set, means for connecting said secondary brush set across said second field exciting winding of said main dynamo-electric machine, means connected across said primary brush set for providing an external primary circuit, a field exciting winding for said metadyne dynamo-electric machine arranged to produce a component of magnetic excitation along the commutating axis of said secondary brush set, and means dependent upon an electrical characteristic of said secondary circuit of said metadyne dynamo-electric machine for energizing said metadyne dynamo-electric machine field exciting winding.

JOSEPH MAXIMUS PESTARINI.